UNITED STATES PATENT OFFICE.

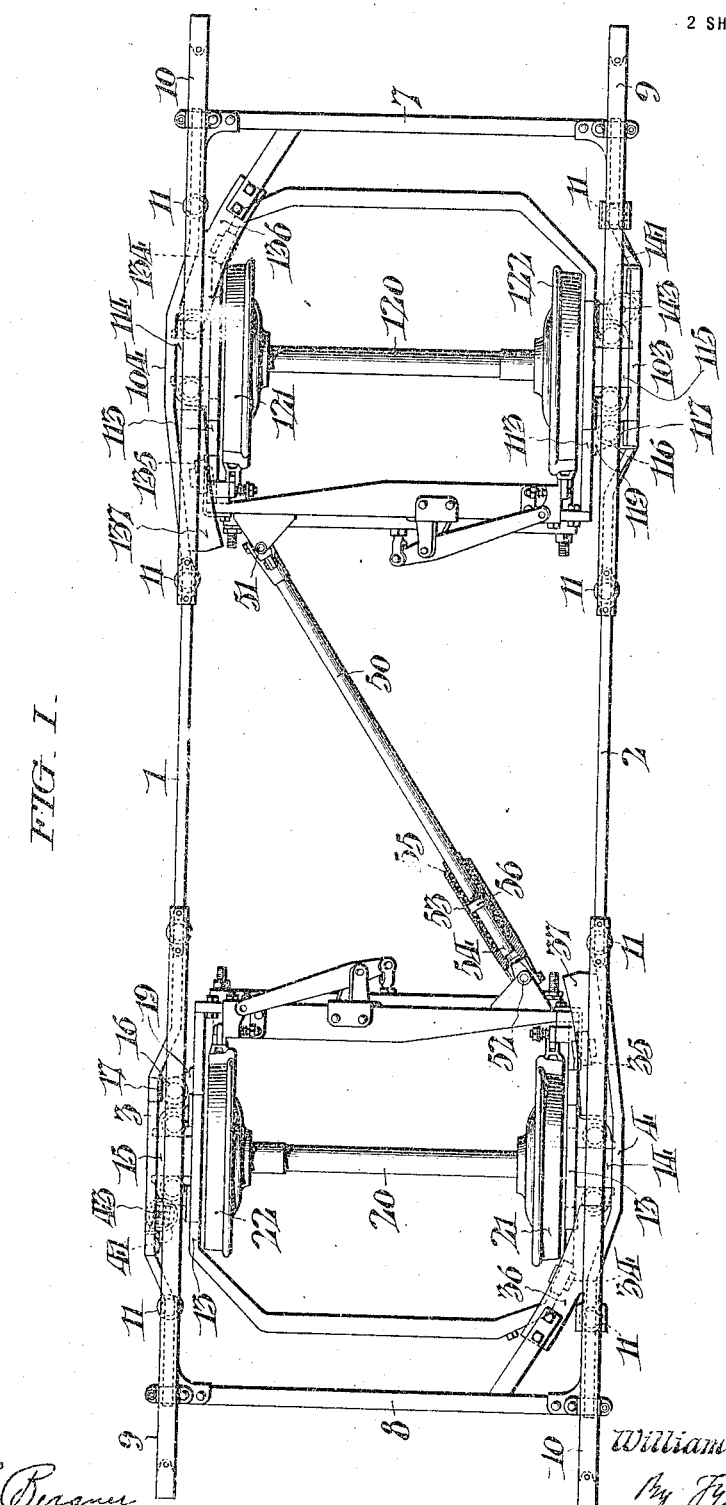

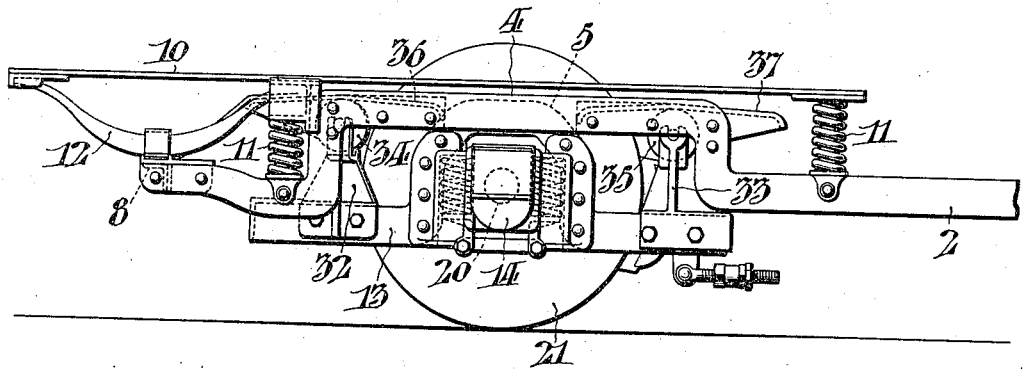
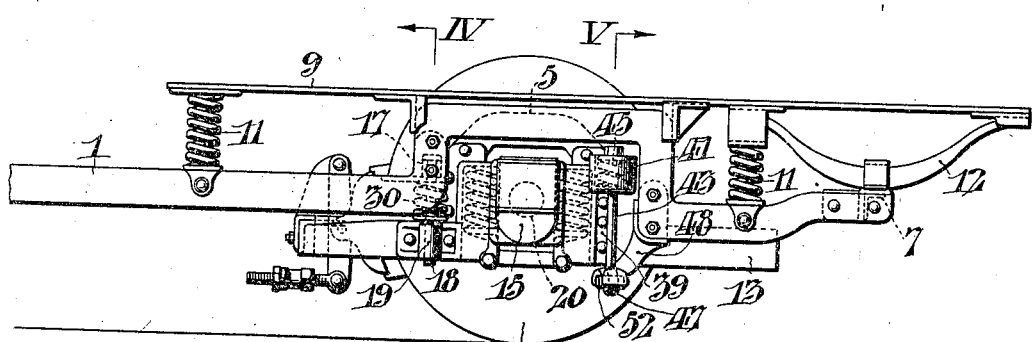
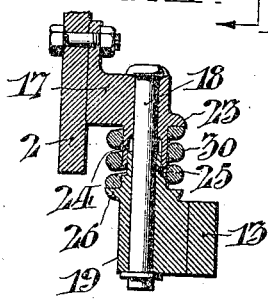
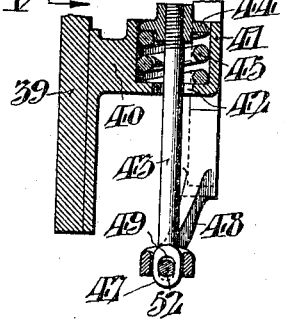
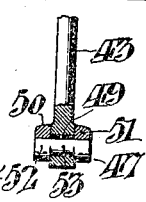

WILLIAM H. STEVENSON, OF PHILADELPHIA, PENNSYLVANIA, ASSIGNOR TO PHILADELPHIA HOLDING COMPANY, OF PHILADELPHIA, PENNSYLVANIA, A CORPORATION OF DELAWARE.

CAR-TRUCK.

1,142,379.  Specification of Letters Patent.  Patented June 8, 1915.

Application filed April 7, 1915. Serial No. 19,694.

*To all whom it may concern:*

Be it known that I, WILLIAM H. STEVENSON, of Philadelphia, in the county of Philadelphia and State of Pennsylvania, have invented certain new and useful Improvements in Car-Trucks, whereof the following is a specification, reference being had to the accompanying drawings.

My invention relates to a truck system of the type which is set forth in Letters Patent of the United States No. 1,091,431, dated March 24th, 1914, further instances thereof being set forth in Letters Patent of the United States No. 1,106,331, dated August 4th, 1914, and No. 1,106,339, dated August 4th, 1914. The general organization thus typified may conveniently be referred to as an oppositely-pivoted and diagonally-correlated truck system.

The present invention comprises improvements in a system of this general character, the principal ultimate objects being to minimize the wear of the car wheel flanges and track, to increase the steadiness of the truck, and to facilitate the characteristic action of the device in entering, running upon, and leaving curved portions of a track.

In order to avoid ambiguity of terms, I will state that in the present specification, I employ the term "truck," as comprehending the structure which immediately carries an axle and a pair of wheels; I employ the term "median plane of the wheels," to indicate an imaginary plane perpendicular to the axis of the axle, and intersecting it midway between the wheels; and I employ the expression "fore-and-aft" to indicate the horizontal direction in which said plane extends.

With this preface I would state that the present invention relates to a structure comprising a pair of trucks, each of which carries only a single axle and pair of wheels, and which will be designated as a single-axle truck. The said trucks are counterparts of one another, but with the several elements reversed in position, that is to say, the parts which are at the right hand side of one are located at the left hand side in the other.

In the accompanying drawings, Figure I, represents a top or plan view of an organization comprising two single-axle trucks, and embodying my invention, said pair of trucks being represented as combined with a rectangular housing. Fig. II, is a view in elevation showing the side nearest the observer, of the truck which is at the left hand end of the structure in Fig. I. Fig. III, is a view in elevation of the opposite side of said truck. Figs. IV, and V, are partial sectional detail views, on an enlarged scale, on the lines indicated respectively at IV, IV, and V, V, in Fig. III. Figs. VI, and VII, are respectively, a partial sectional view, and a view in perspective, of certain parts shown at the lower end of Fig. V.

As above stated, the trucks are, structurally, counterparts of one another, the lateral positions of their respective pivotal points and free points of support being reversed. Hence, it will only be necessary to describe in detail one of said trucks, similar figures of reference, raised by one hundred, being employed to indicate the corresponding parts of the other truck; thus, the axle in the truck which is nearest the left hand end of Fig. I, and which is there numbered 20, is numbered 120, in the truck nearest the right hand end of Fig. I, and so on through the enumeration of the several parts.

Referring now to Fig. I, it will be seen that the trucks are mounted within a rectangular housing which comprises the longitudinal members 1, and 2, bowed laterally outward at the regions adjacent to the trucks, as shown at 3, 103, 4, and 104, and also arched at the regions of the axle boxes, as shown at 5, and 105, said members being connected by the transverse members 7, and 8. This housing carries near its respective ends the longitudinal sill-plates 9, 9, and 10, 10, for the car body, (not shown), said sill-plates being spring-supported in any convenient manner, as indicated by the spiral springs 11, and elliptical springs 12. The truck itself is an approximately rectangular frame, and referring particularly to the one shown at the left hand end of Fig. I, it will be seen that the sides 13, 13, are inclosed within the bowed portions 3, and 4, of the housing, the journal boxes 14, and 15, being provided with the usual springs, as indicated by the dotted lines. The axle is represented at 20, and the car wheels at 21, and 22. At the side remote from the observer, the truck is pivotally mounted at 16, upon a vertical axis, the details of the pivot being shown in Fig. IV, and the general relation of the parts being indicated in Fig.

III, where however, the corresponding side of the truck at the right hand end of Fig. I, is represented in side elevation.

The pivotal connection is preferably as indicated in detail in Fig. IV, that is to say, an inwardly projecting bracket 17, is mounted upon the inner face of the bowed portion 3, of the housing, and is perforated to receive a vertical pivot 18, which extends down through a perforated bracket 19, projecting outwardly from the side 13, of the truck frame. The bracket 17, has a horizontal annular shoulder 23, and a downwardly projecting tubular portion or sleeve 24, which is of sufficient internal diameter to receive snugly a tubular projection or sleeve 25, which extends upwardly from an annular shoulder 26, of the bracket 19. The sleeves thus telescoping together and embracing the pivot 18, are surrounded by a spiral spring 30, whose ends are respectively seated upon the shoulders 23, and 26, of the two brackets, so that while the device is capable of a certain amount of yielding in a vertical direction, it provides a definite vertical axis of oscillation.

The parts just described constitute one point of connection and support between the truck and the housing, upon the pivoted side of the truck. To enhance uniformity of action and avoid tilting of the truck, I provide a secondary point of support at that side, consisting of the following parts, shown in detail in Fig. V. A bracket 40, is mounted upon an upright 39, carried by the side piece 13, of the truck, at a point within the opening of the arch of the housing. Said bracket 40, is provided with a tubular socket 41, having an elongated aperture 42, in its bottom and receives a vertical link 43, having a head 44, which rests upon a spring 45, carried within the said socket 41. The lower end of the link is pivotally attached at 47, to an underhanging bracket arm 48, carried upon the housing 3. A convenient method of pivotal attachment is that shown in Figs. VI, and VII, where it will be seen that the lower end of the link 43, is provided with a slot 49, of elongated or oval cross section, said slotted end being embraced between the lugs 50, and 51, of the bracket 48. A pin 52, whose extremities are of oval cross section, but whose central portion 53, is cylindrical, can be slipped into position through the oval portion of the slot 49 and then turned downward so as to be secured, while permitting oscillation of the link 43. The second point of support afforded by the swinging link 43, is located with reference to the axle 20, in substantial symmetry with the pivotal support at 16, that is to say, the two points are in the same line fore and aft and about equidistant from the axle. On the side nearest the observer in Fig. I, (which is shown in side elevation in Fig. II), the truck is provided with two vertical standards 32, and 33, which carry, respectively, friction rollers 34, and 35, said rollers respectively engaging the double-inclined overhead tracks 36, and 37, which are mounted upon the housing. Said tracks are slightly curved, the center of curvature being in each instance the axis of the pivotal mounting at 16, but the radial distances differ slightly in order to conveniently restrict the dimensions of the truck and hence the tracks 36, and 37, though concentric, are not identical. It will thus be seen that on the pivoted side (which is farthest from the observer at the left hand end of Fig. I), there are two independent points of connection and support between the truck and the housing, one fixed, the other free, viz.—the pivotal connection at 16, and the link connection at 43, and that on the other side, (which is nearest the observer at the right hand end of Fig. I), there are two free points of support, viz.— the points of rolling contact between the rollers 34, and 35, and their respective tracks 36, and 37. It will also be seen that the pivotal support at 16, is located not only at a point remote from the median plane of the car wheels, but also at a substantial distance in a fore and aft direction from the axis of the axle 20. The practical result of thus locating the pivotal axis is to substantially reduce the difference between the radii of the respective arcs described by corresponding points upon the flanges of the car wheels 21, and 22, when the truck turns upon said axis, and hence to facilitate the effort of the wheel flanges to attain a position of least total resistance to the track, when entering, running upon, or leaving a curve.

As before stated, the truck represented at the right hand of Fig. I, is the counterpart of that just described, with the exception that the lateral position of the pivotal point and correlated supporting elements is reversed. It is sufficient therefore to state that the definite pivotal axis of the axle 120, and wheels 121, and 122, is situated at 116. The two oppositely-pivoted single-axle trucks just described are combined with one another through the medium of the diagonal connecting rod 50, which is pivotally connected to the respective trucks at the points 51, and 52, one of the connections preferably comprising means for permitting a spring-resisted longitudinal play of the link 50. Said means in the present instance are shown in section in Fig. I, where it will be seen that an enlongated socket or sleeve 53, is directly pivoted to the truck 52, said sleeve being of sufficient internal diameter to close for a considerable distance the end portion 54, of the rod 50, and a surrounding spring 55, whose respective ends are seated within the cavity of the sleeve, a flange or collar 56, being mounted upon the rod 50, in such relation to the spring as to operatively engage it when the rod is shifted longitudinally in either direction. The organization thus constituted manifests the characteristic mode of operation of the type of truck set forth in the patents above recited, the action however, being modified by reason of the fact that the pivots 16, and 116, are not only located at points remote from the median plane of the car wheels carried by the respective trucks, but are also located at substantial distances in a fore and aft direction from the respective axes of the axles 20, and 120. Where, as in the present invention, each truck carries but one axle and its pair of wheels, the location of the pivotal points in the manner above described, results in a peculiar correlation between the wheel flanges and the track when entering, running upon, or leaving a curve. This action, as affecting the sum total of resistances between the flanges and the track, comprises an important modification of that which results where each axle of a single-axle truck is pivoted in the line of its axis, and at a distance from the median plane, and also of the action which results where each truck carries two axles with respective pairs of wheels, and is pivoted at a point between said axles, as for instance, in one form of the device set forth in the above mentioned Letters Patent No. 1,091,431, dated March 24th, 1914.

It will be noted that in the above described embodiment of my invention, there is provided, upon the pivoted side of the truck, an additional supporting member, which, in the instance specified, is a swinging link. The two points of connection and support, viz. the pivot and the swinging link, are shown as located at approximately similar distances fore and aft, with relation to said axle. While the above constitutes the preferred construction, I wish it to be understood that I do not limit myself to the use of a swinging link as the auxiliary support at the region indicated, nor to the location of either of said supports at the particular points selected for illustration.

The degree of remoteness of the pivotal point from the axle is an important factor in developing the characteristic action, since speaking generally, the difference between the curvature of the arcs described by the corresponding points upon the respective wheel flanges of the pair, when the truck swings upon the pivot, diminishes in a progressive ratio in accordance with the remoteness of the pivotal point from the axle. The location of said pivotal point, however, is practically determined by general structural conditions, and hence, the one actually shown in the present instance may be said to be a compromise between the limitations of structure and the position theoretically most desirable. I mention this because I do not wish my claims to be evaded by modifications of the indicated positions of said pivotal points, i. e., whether they are fore or aft of the axle, or by the selection of different pivotal points for the respective trucks, or by employing the specific feature of fore-and-aft location of the pivotal point in only one of the trucks. It will also be understood that in the organization described the rectangular housing which carries the points of support for the trucks is to be taken as typical of the car-body structure, its function of inclosing the working members being merely an adjunctive feature of convenience. In the broader claims, therefore, said housing will be designated as the car-body.

Having thus described my invention, I claim:

1. In an oppositely-pivoted and diagonally-correlated car truck system, the combination, with a car, of a single-axle truck; a supporting connection between the car and said truck adapted to permit rotative movement about a definite vertical axis, located at a substantial distance laterally from the median plane of the wheels, the said vertical axis being also located at a substantial distance in a fore and aft direction, from the axle of said truck; means for freely supporting the car at the side where said vertical axis is situated, said means being located on the side of the axle which in a fore and aft direction is opposite to the location of the vertical axis; a second single-axle truck provided with a supporting connection for the car, adapted to permit rotative movement about a definite vertical axis located at a substantial distance laterally from the median plane of the wheels and on the side thereof opposite to the location of the vertical axis of the first-mentioned truck; means upon each truck for freely supporting the car at that side of the median plane which is opposite to the location of the vertical axis; and means for correlating the rotative movements of said trucks.

2. In an oppositely-pivoted and diagonally-correlated truck system, the combination, with a car, of two trucks, each truck carrying a single axle and pair of wheels; a vertical pivot and surrounding bearings intervening between each truck and the car, said pivot being located at a substantial distance laterally from the median plane of the car wheels, and being also located at a substantial distance, in a fore and aft direction, from the axle; means for freely supporting the car at that side of the median plane which is opposite to the location of said pivot; and means for freely supporting the car at the side of the median plane where the pivot is situated, said last mentioned means being located at the side of the axle opposite to the pivot in a fore and aft direction; and means connecting the non-pivotal sides of the respective trucks for correlating the rotative movements of said trucks.

3. In an oppositely-pivoted and diagonally-correlated truck system, the combination, with a car, of two trucks, each truck carrying a single axle and pair of wheels; a connection and support between the car and each truck comprising a vertical pivot having vertical play; a pair of oppositely shouldered brackets surrounding said pivot, and a spring intervening between the shoulders of said brackets, said pivot being located a substantial distance from the median plane of the wheels, and being also at a substantial distance from the axle in a fore and aft direction; means for freely supporting the car at a plurality of points on the sides of the median plane, opposite to said pivot; means for freely supporting the car upon the side of the median plane at which the pivot is situated, but at a point upon the opposite side of the axle, in a fore and aft direction, from said pivot; and means connecting the non-pivoted sides of the respective trucks, for correlating the rotative movements thereof.

4. In an oppositely-pivoted and diagonally-correlated truck system, the combination, with a rectangular housing arched at the regions of the trucks; of a pair of single-axle trucks, each of said trucks being provided with a vertical pivot, and surrounding bearing shoulder; a bearing for said pivot and a surrounding shoulder carried by the housing at one upright of its arched portion, each of said trucks being also provided with a bracket arranged within the opening of said arched portion; a link freely carried by said bracket; a bracket arm carried by the housing and pivotally engaging the lower end of said link, said pivot and link being arranged on opposite sides of the axle in a fore and aft direction; a pair of segmental tracks carried by the housing upon the side of the median plane opposite to that of said pivotal support; a pair of brackets and friction rollers mounted upon the truck, and engaging said tracks; and a diagonal link pivotally connected to the trucks at the non-pivoted sides thereof.

5. In an oppositely-pivoted and diagonally-correlated truck system, the combination with a car, of two single-axle trucks; a vertical pivot upon each truck, having telescoping sleeves and surrounding bearing shoulders provided with an interposed spring, the pivots of said trucks being located respectively on opposite sides of the median plane of the wheels and at a substantial distance from said plane, and being also located at a substantial distance from the respective axles in a fore and aft direction; means on each truck for freely supporting the car at a plurality of points, on the side of the median plane, opposite to said pivot; means upon each truck, for freely supporting the car upon the side of the median plane at which the pivot is situated, but at a point upon the opposite side of the axle in a fore and aft direction from said pivot; and a link connecting the non-pivoted sides of the respective trucks; said link comprising a longitudinally telescoping portion provided with a spring adapted to resist telescoping movement in each direction.

In testimony whereof, I have hereunto signed my name, at Philadelphia, Pennsylvania, this sixth day of April, 1915.

WILLIAM H. STEVENSON.

Witnesses:
JAMES H. BELL,
E. L. FULLERTON.